United States Patent Office 3,513,007
Patented May 19, 1970

3,513,007
MIXED COATING PROCESS
Gerald Lederer, Stockton-on-Tees, England, assignor to British Titan Products Company Limited, Billingham, County Durham, England, a corporation of the United Kingdom
No Drawing. Filed July 14, 1966, Ser. No. 565,077
Claims priority, application Great Britain, July 21, 1965, 30,917/65
Int. Cl. C09c 1/36, 3/00
U.S. Cl. 106—300                              6 Claims

ABSTRACT OF THE DISCLOSURE

An improved multiple step process for coating titanium dioxide pigment particles is disclosed comprising forming an aqueous dispersion of the particles, adding to the dispersion a water-soluble hydrolysable compound of silicon, titanium and/or zirconium and/or phosphate or phosphoric acid, adjusting the pH of the dispersion to a value in the range of about 3 to 7.5 and thereafter adding simultaneously to the suspension a water-soluble hydrolysable compound of aluminum, cerium and/or calcium and an alkali in such a manner as to maintain the pH value of the suspension in the range 6 to 10 throughout the addition.

---

The present invention relates to improved processes for coating metal oxide pigments, particularly titanium dioxide pigments.

Pigmentary titanium dioxide particles are commonly coated with hydrous oxides of certain metals, for example with oxides of titanium, aluminum, zirconium, cerium and/or silicon (which, for the purpose of this specification is defined as a metal) and with other materials for example with a phosphate (which may, if desired, be the phosphate of one of the metals mentioned above).

Such processes usually consist of forming an aqueous suspension of the titanium dioxide pigment, if desired in the presence of a dispersing agent, and thereafter adding to the dispersion one or more water-soluble hydrolysable salts(s) of the metal(s), the oxide(s) of which are to be deposited upon the pigment particles. The sulphates of the metals are the most widely used salts for this purpose although, among other compounds, nitrates, acetates and chlorides have also been used.

The pH value of the suspension is usually lowered by the addition of the salt(s) owing to its initial hydrolysis and the pH value is then raised by the addition of an alkali, for example an alkali metal hydroxide or carbonate or ammonium hydroxide.

Where the particles are to be coated with hydrous silica, at least part of the pH adjustment may be achieved by the addition of an alkali metal silicate which, in addition to being alkaline in reaction, forms hydrous silica upon the particles.

Alternatively, where a coating of silica is required, an alkali metal silicate may be used as the dispersing agent and the pH value may be adjusted by the addition of an alkali.

After coating, the pigment particles are normally recovered, washed, dried and/or milled, for example in a fluid energy mill.

Whereas such coating procedures have proved to be of great value in titanium dioxide pigment production they may not produce pigments of the highest tinctorial strength or gloss (when incorporated into paints) of which the pigment is capable. Such coating procedures may also produce pigments which retard the drying time of paints containing them.

It is an object of the present invention to provide an improved process for coating metal oxide particles, particularly pigmentary titanium dioxide particles.

Accordingly, the invention is a process for coating metal oxide pigment particles comprising forming an aqueous dispersion of the particles, adding to the dispersion a water-soluble hydrolysable compound of silicon, titanium and/or zirconium and/or a phosphate or phosphoric acid, adjusting the pH of the dispersion to a value in the range of about 3 to 7.5 and thereafter adding simultaneously to the suspension a water-soluble hydrolysable compound of aluminum, cerium and/or calcium and an alkali in such a manner as to maintain the pH value of the suspension in the range 6 to 10 throughout the period of addition.

After treatment by the process of the present invention the suspension is preferably allowed to stand, for example for at least about 15 minutes, before finally adjusting the pH to a value in the range 7 to 9.5.

The aqueous dispersion of titanium dioxide may, if desired, be formed in the presence of a dispersing agent.

If the pigment is to be coated with a hydrous oxide of silica or phosphate the dispersing agent may be an alkali metal silicate (which is a water-soluble hydrolysable compound of silicon) and/or phosphate and this compound(s) may provide some or all of the silica and/or phosphate coating.

Alternatively, an organic dispersing agent may be used, for example an isopropanolamine, either by itself or in combination with an inorganic dispersing agent.

The water-soluble, hydrolysable compound of titanium or zirconium is preferably a salt of the metal having an anion derived from a mineral acid, for example the sulphate, chloride or nitrate. Alternatively, it may be derived from an organic acid, for example the acetate, but this is not preferred. The sulphate or chloride is the preferred salt.

Where a phosphate coating is required on the pigment this may be formed by the addition of water-soluble ortho-, meta- or pyro-phosphate (which may also act as a dispersing agent as previously mentioned) or phosphoric acid. Alkali metal or ammonium orthophosphate are the preferred water-soluble phosphates.

Sufficient of the soluble and hydrolysable compound(s) of silicon, titanium and/or zirconium and/or a phosphate or phosphoric acid is suitably added to form upon the pigment particles an amount of the hydrous oxide of the metal(s) (either singly or in combination) in the range 0.3% to 5% and preferably in the range 0.5% to 2% (on $TiO_2$) and an amount of phosphate in the range of 0.5% to 5% and preferably in the range 1% to 4% (estimated as $P_2O_5$ on $TiO_2$).

After the addition of the hydrolysable compound(s) of silicon, titanium and/or zirconium and/or phosphate or phosphoric acid the pH of the suspension is adjusted to a value in the range 3 to 7, if required. Where such an adjustment is necessary it is generally carried out by the addition of alkali, for example an alkali metal hydroxide, or carbonate or ammonium hydroxide.

The exact pH value to which the suspension is adjusted in this range will depend to some extent upon the soluble and hydrolysable metal compounds present. The pH is normally adjusted to a value in the range at which substantially all the metal(s) is precipitated in the form of a hydrous oxide(s) upon the pigment particles.

The hydrous oxide of aluminum, cerium and/or calcium is then applied to the pigment by the simultaneous addition of a water-soluble, hydrolysable compound of one or more of these metals and an alkali.

Again the soluble, hydrolysable compounds of the metals are preferably the salts of the metal having an anion derived from a mineral acid, for example the sulphate, chloride or nitrate of the metals.

The alkali, which is simultaneously added, is preferably an alkali metal hydroxide or carbonate or ammonium hydroxide.

The addition of the metal compound and alkali is preferably made in such a manner that the pH of the suspension remains constant at a predetermined value in the range of 6 to 10 and particularly in the range of 7 to 9.5 throughout the period of the addition.

Sufficient hydrolysable metal compound is added simultaneously with the alkali to precipitate upon the pigment particles an amount of the corresponding hydrous metal oxide (either singly or in combination) in the range 1% to 6% and preferably an amount in the range 1.5% to 3% by weight on $TiO_2$.

After the addition of metal compound and alkali the suspension is normally allowed to stand for a period of at least 15 minutes and preferably at least 30 minutes before recovery of the coated particles, for example by filtration, and thereafter the particles are washed, dried and/or milled, particularly in a fluid energy mill.

Before recovery of the particles the pH of the suspension is preferably adjusted, if necessary, to a value in the range 7 to 9.5, and particularly to a value of about 7.5.

It has been found that when titanium dioxide pigment particles are coated by the process of the present invention they usually have a higher tinting strength and give a better gloss when incorporated into paints than do similar pigments coated with similar compounds by previously known methods. The pigments may also produce paints having a shorter drying time when incorporated therein.

The method may be applied to either anatase or rutile pigments which may have been produced either by the sulphate process or by the oxidation, in the vapour phase, of a titanium tetrahalide, for example titanium tetrachloride.

In order to obtain the maximum benefit from the present process it is preferred to coat pigments which are predominantly of the rutile modification (i.e. at least 95%) and which have been prepared by the vapour phase oxidation of titanium tetrachloride.

The following examples show embodiments of the present invention and the coated pigments thus produced are compared with similar pigments coated by other methods.

EXAMPLE 1

To an aqueous suspension of rutile $TiO_2$ pigment particles at a concentration of 220 g./litre and containing sodium silicate was added an aqueous titanyl sulphate solution (105 g./litre $TiO_2$ and an acid/$TiO_2$ ratio of 3). Sufficient titanyl sulphate solution was added to give a coating of $TiO_2$ on the pigment particles of 1.5%.

The suspension was maintained at 50° C. during the addition of the titanyl sulphate solution (over a period of 15 minutes).

The mixture was then stirred for 15 minutes after which an aqueous solution of sodium hydroxide was added over a period of 15 minutes to obtain a pH value of 7.5.

Aqueous solutions of aluminium sulphate (50 g./litre) and sodium hydroxide was run into the suspension simultaneously over a period of 30 minutes with vigorous stirring and at such a rate that a pH value of 6 was maintained. Sufficient aluminium sulphate was added to provide 2% aluminium (by weight on $TiO_2$) on the pigment particles.

The suspension was allowed to stand for 30 minutes after which the pH value was adjusted to 7.5 with sodium hydroxide and the pigment was recovered, washed, dried and fluid energy milled.

EXAMPLE 2

The process described in Example 1 was repeated except that the pH value, during the addition of the aluminium sulphate, was maintained at 7.5.

EXAMPLE 3

The process described in Example 1 was repeated except that the pH value, during the addition of the aluminium sulphate, was maintained at 9 and the final adjustment to pH 7.5 was by the addition of sulphuric acid.

EXAMPLE 4

A pigment was prepared by a process not according to the present invention, for the purpose of comparison, by the following method.

A similar pigment to that used in Examples 1 to 3 was suspended in water in the presenue of sodium silicate at 50° C. and sufficient titanyl and aluminium sulphate to give a coating of 1.5% $TiO_2$ and 2% $Al_2O_3$ was added over a period of 15 minutes.

The suspension was then stirred for 30 minutes and the pH value adjusted to 7.5 by the addition of sodium hydroxide over 30 minutes.

The pigment was then recovered, washed, dried and fluid energy milled.

The pigments produced in Examples 1 to 4 were then incorporated into an oleoresinous paint medium.

The gloss (at 45°), tint reduction and drying time of the resulting paints were measured (as described later) and the results are given in Table 1.

TABLE 1

| Example | Gloss | Tint reduction (percent improvement) | Drying time (hrs.) |
|---|---|---|---|
| 1 | 95.7 | +1 | 12 |
| 2 | 95.5 | +2 | 13½ |
| 3 | 95.3 | +3 | 15½ |
| 4 | 90.4 | −2 | 16 |

EXAMPLE 5

The process described in Example 1 was repeated except that sufficient sodium silicate to form a total of 1.5% $SiO_2$ on the pigment was added to the initial suspension at 50° C. over a period of 15 minutes followed by sufficient aqueous normal sulphuric acid to give a pH of 7.5 over a period of 15 minutes.

The aqueous solutions of aluminium sulphate and sodium hydroxide were then simultaneously added to maintain a pH value of 6 and the pigment was ultimately recovered and treated as described in Example 1.

EXAMPLE 6

The process described in Example 5 was repeated but the pH value during the addition of aluminum sulphate was maintained at 7.5.

EXAMPLE 7

For the purpose of comparison with pigments of Examples 5 and 6 similar $TiO_2$ particles were coated by a conventional process with 1.5% silica and 2% alumina, recovered, washed, dried and fluid energy milled.

The pigments produced in Example 5, 6 and 7 were tested as described in Example 1. The results are given in Table 2.

TABLE 2

| Example | Gloss | Tint reduction (percent improvement) | Drying time (hrs.) |
|---|---|---|---|
| 5 | 92.1 | −7 | 10¼ |
| 6 | 93.4 | −3 | 9½ |
| 7 | 80.3 | −16 | 10¼ |

NOTE.—The Tint Reduction value of pigments coated with silica in the manner described is generally lower than that of the standard pigment.

EXAMPLE 8

The process described in Example 5 was repeated but using an equivalent amount of zirconium sulphate in place of sodium silicate and the pH value of the suspension was adjusted to 3 with sodium hydroxide after the addition of the zirconium sulphate and before the addition of the aqueous aluminium sulphate and sodium hydroxide solutions.

EXAMPLE 9

The process of Example 8 was repeated but the pH value during the aluminium sulphate/sodium hydroxide addition was maintained at 7.5.

EXAMPLE 10

The process of Example 8 was repeated but the pH value during the aluminium sulphate/sodium hydroxide addition was maintained at pH 9.

EXAMPLE 11

A similar pigment to that used in Examples 8 to 10 was coated by a conventional process with 1.5% zirconia and 2% alumina after which it was recovered, washed, dried and fluid energy milled.

The pigments produced in Examples 8 to 11 were tested as described in Example 1. The results are given in Table 3.

TABLE 3

| Example | Gloss | Tint reduction (percent improvement) | Drying time (hrs.) |
|---|---|---|---|
| 8 | 93.3 | +2 | 12 |
| 9 | 94.4 | +3 | 10¾ |
| 10 | 96.5 | +6 | 7¼ |
| 11 | 29.5 | +1 | 12½ |

The gloss of the paints containing the pigments was determined by ball milling the pigment in an alkyd resin/urea formaldehyde resin mixture at 19% by volume pigment concentration and thereafter applying the paint to a glass surface at a dry film thickness of about 38 microns. The paint was stoved after air drying at 120° C. for 30 minutes.

The gloss of the stoved paint was estimated at 45° by a Hunterlab "Sharpness of Image" Glossmaster.

The Tint Reduction values are obtained by ball milling the pigment with an alkyd resin (19% by volume pigment concentration) containing a fixed amount of a coloured pigment to give a coloured paint.

The product is compared in each case with a similar paint containing known varying amounts of a very high performance rutile pigment coated with titania and alumina (which is retained as a standard for this purpose).

The comparison is obtained by drawing down a paint containing the standard pigment on each side of a sample of the paint containing the test pigment.

When a paint containing the standard pigment and one containing the test pigmet are found to match (when examined visually by an experienced operator) the difference (expressed as a percentage) of the pigment content of the two paints is noted. Where the content of the standard pigment is higher than that of the test pigment then the latter has a higher tint reduction value than the standard pigment (and vice versa).

In the tables this has been converted into a direct comparison with the standard pigment.

The Drying Time of the paints containing the pigments is obtained by ball milling an alkyd resin and pigment (the latter in 19% concentration by volume) and allowing the paint to stand in a sealed vessel for 24 hours.

The paint is then applied to a smooth surface (at 33μ film thickness) and the drying time estimated by a Beck-Koller "Drying Time Tester."

What is claimed is:
1. A process for coating titanium dioxide pigment particles comprising the steps of
  forming an aqueous dispersion of the particles;
  adding to the dispersion at least one compound selected from the group consisting of:
    (a) the water soluble, hydrolysable compounds of at least one member of the group consisting of silicon, titanium, and zirconium,
    (b) the water soluble hydrolysable phosphates, and
    (c) phosphoric acid
  in an amount corresponding to a coating of from 0.3% to 5% of corresponding hydrous oxide based on $TiO_2$ when said selected compound is (a), and corresponding to a coating of from 0.5% to 5% as $P_2O_5$ based on $TiO_2$ when said selected compound is (b) or (c);
  adjusting the pH of the dispersion to a value in the range of 3 to 7.5 at which substantially all of said added compound precipitates on said pigment particles; and
  thereafter adding simultaneously to said suspension (i) at least one water soluble hydrolysable compound of a member of the group consisting of aluminum, cerium, calcium and mixtures thereof, in an amount corresponding to a coating of from 1% to 6% of corresponding hydrous metal oxide based on $TiO_2$, and (ii) sufficient alkali to maintain the pH value of the suspension in the range of 6 to 10 throughout the addition of said compound (i).

2. A process as claimed in claim 1 wherein the suspension is allowed to stand after the additions have been complete and the pH of the suspension is then adjusted to a value in the range 7 to 9.5.

3. A process as claimed in claim 2 wherein the pH is adjusted to a value of about 7.5.

4. A process as claimed in claim 1 wherein the suspension is allowed to stand for a period of at least 15 minutes.

5. A process as claimed in claim 1 wherein the suspension is allowed to stand for a period of at least 30 minutes.

6. A process as claimed in claim 1 wherein the water-soluble hydrolysable compound of aluminium, cerium and calcium and the alkali are added in such a manner as to maintain the pH value of the suspension in the range 7 to 9.5 throughout the period of addition.

References Cited

UNITED STATES PATENTS

| 2,284,772 | 6/1942 | Seidel. | |
| 2,387,534 | 10/1945 | Seidel | 106—300 |
| 3,035,966 | 5/1962 | Siuta | 106—300 |
| 3,146,119 | 8/1964 | Ritter | 106—300 |
| 3,251,705 | 5/1966 | Rieck et al. | 106—300 |
| 3,383,231 | 5/1968 | Allan | 106—300 |
| 2,668,776 | 2/1954 | Miller | 106—300 |
| 3,127,280 | 3/1964 | Whately | 106—300 |
| 3,141,788 | 7/1964 | Whately | 106—300 |

TOBIAS E. LEVOW, Primary Examiner

H. M. S. SNEED, Assistant Examiner

U.S. Cl. X.R.
106—308, 309